United States Patent [19]
Boettcher

[11] 4,200,186
[45] Apr. 29, 1980

[54] TRANSFER CONVEYOR FOR ELONGATED WORKPIECES

[75] Inventor: Carl E. Boettcher, Evansville, Ind.

[73] Assignee: AIMAC, Inc., Evansville, Ind.

[21] Appl. No.: 905,402

[22] Filed: May 15, 1978

[51] Int. Cl.² ............................................. B65G 17/48
[52] U.S. Cl. .................................... 198/800; 198/648
[58] Field of Search .............. 198/472, 648, 793, 797, 198/798, 800, 802

[56] References Cited

U.S. PATENT DOCUMENTS

| | | | |
|---|---|---|---|
| 695,287 | 3/1902 | Davy | 198/797 |
| 1,869,794 | 8/1932 | Bell | 198/802 |
| 2,092,737 | 9/1937 | Perry et al. | 198/798 |
| 2,965,049 | 12/1960 | Royer | 198/797 |
| 3,447,666 | 6/1969 | Nevo-Hacohen | 198/800 |

Primary Examiner—Jeffrey V. Nase
Attorney, Agent, or Firm—Wood, Herron & Evans

[57] ABSTRACT

A conveyor for moving an elongated workpiece around a loop path without turning it end for end. A track is provided in the form of a loop with at least one main run, which may be straight, and loop ends that join the main run at spaced positions. Auxiliary end tracks are offset from the respective loop ends and join the main run with the loop ends, at junctions. A carrier having a pair of track followers engages the track and is propelled by an endless drive. A switch is operable to connect the main run to the respective loop end or alternatively to the respective auxiliary end. The switch is controlled by a switch operator that is responsive to the position of a carrier to operate the switch after a first follower on a carrier has passed the switch, but before the second follower has passed the switch, so that the carrier then moves laterally to the main run with one follower engaging the loop end and the other follower moving on the auxiliary end. The workpiece may be maintained in an orientation parallel to the main run, while it is moving laterally.

15 Claims, 8 Drawing Figures

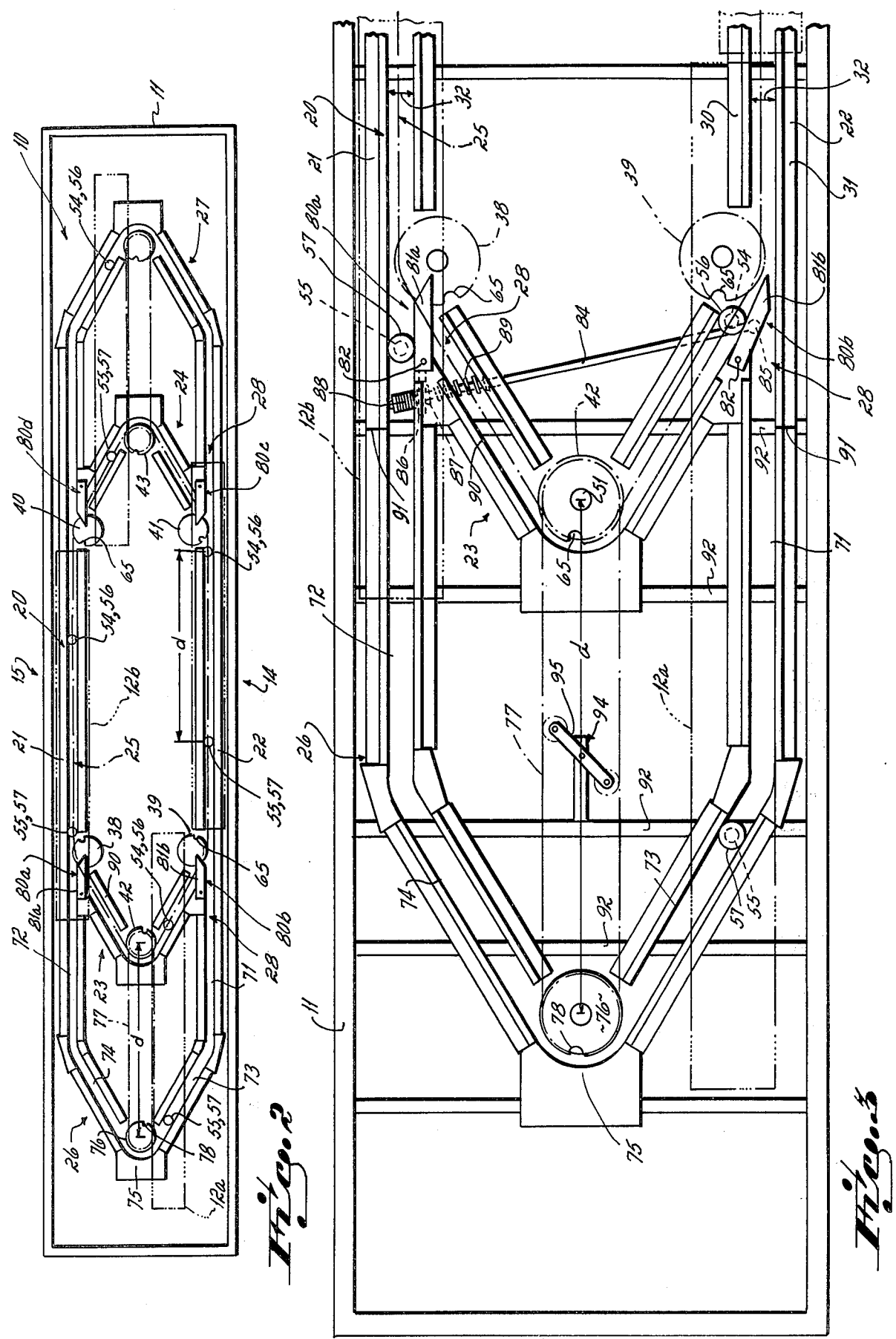

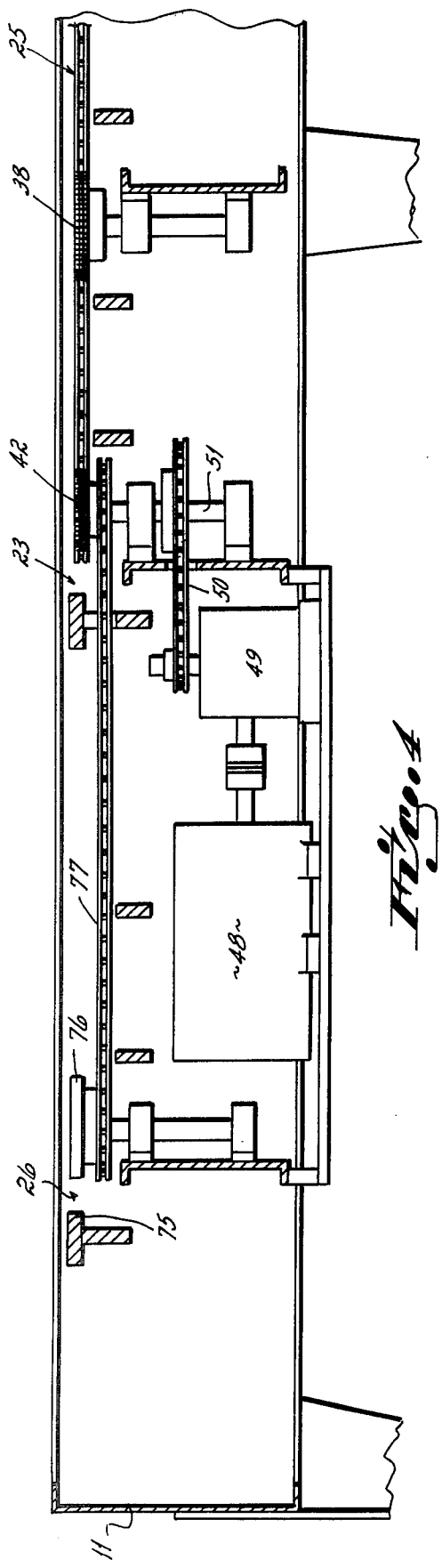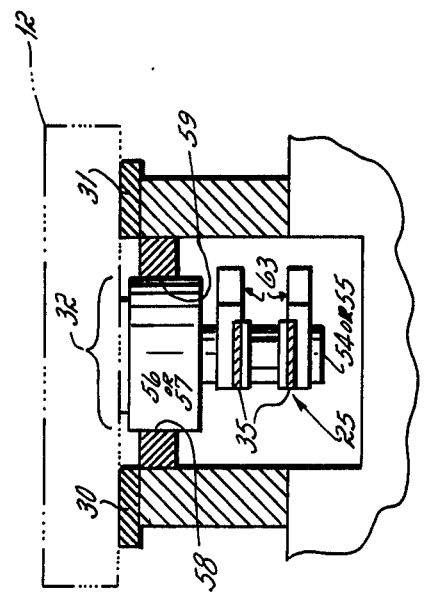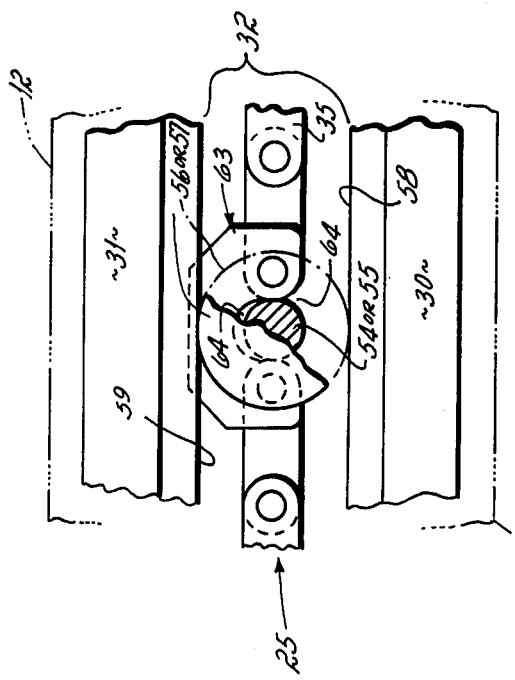

TRANSFER CONVEYOR FOR ELONGATED WORKPIECES

FIELD OF THE INVENTION

The invention relates to transfer conveyors for moving workpieces around a loop path without rotating them end for end. Such conveyors may be used to maintain workpieces always parallel to a desired direction.

BACKGROUND OF THE INVENTION

For various purposes it is desirable or necessary to move elongated workpieces on a loop path that passes through a work or processing station in a longitudinal direction, without rotating the workpiece 180° at each end of the loop. For example, where dry printing is to be applied to an elongated workpiece by a roll-on process, straight line travel is necessary while the printing head is transferring the print; smearing or improper print transfer would arise if the workpiece moved on a curved path past the head. Such straight line travel is easily accomplished for short workpieces: they can be carried on an endless conveyor and can turn with the conveyor as it circles around. However, with elongated workpieces (particularly those having a length of about two feet or more) it becomes impractical to turn such a long workpiece around an end radius. The space required for the swing at the ends is undesirably great.

This invention is directed to a conveyor for moving an elongated workpiece around an endless loop path of travel that includes main longitudinal runs, by moving it laterally (transversely to its length) at the ends of the main runs, and thereby avoiding the problem of excessive end swing. The width of the conveyor is thereby enabled to be substantially reduced.

BRIEF DESCRIPTION OF THE INVENTION A

Briefly, in preferred form the invention comprises a track which is in the form of a main loop having two main runs which may be parallel straight runs, and main loop ends that join the main runs at spaced positions. The track also includes auxiliary ends which are offset longitudinally from the respective main loop ends. The corresponding main loop ends and auxiliary ends meet the main runs at junctions. The workpiece is carried on a carrier which has longitudinally spaced apart first and second track followers that are engageable with the track to follow it. An endless loop drive, such as a chain drive, extends around the main loop and is engageable with the carrier for propelling it. A switch or gate is provided at the downstream junction of each main run with the respective main loop end and auxiliary end (i.e., at the junction in the direction of drive movement on the main run). A switch operator is provided for each switch and this operator is responsive to the position of a carrier on the track, to operate the switch after the first follower on a carrier moving from the main run has passed the switch, but before the second follower of that carrier has passed that switch. The switch thereby directs one follower of the carrier to move on the main loop end and the other follower of that carrier to move on the respective auxiliary end. The carrier then moves laterally with its ends on different tracks, and its direction of movement is thereby reversed without turning it around.

In preferred form the switch operator is responsive to the position of a preceding carrier which is also moved by the drive. The switch operator preferably comprises means which cross-connect two switches at the opposite junctions of the ends with the opposite main runs. A switch at the downstream end junction is cammed by a follower of a carrier passing it, and that movement is transmitted through cross-connecting means to operate the switch at the upstream junction of the particular end.

The track preferably comprises a pair of spaced apart rails which define a cam slot between them. The cam followers are guided by the sides of the slot. The drive engages the carrier through drive connections which are adjacent the respective followers, these drive connections preferably being in the form of pins projecting axially below the track followers. They are releasably engageable with the drive and the carrier is driven by whichever or both of the connections that engage the drive at the particular point. When the carrier is moving around the ends between the opposite main runs, only one of the drive pins on a given carrier is engaged with the drive. The opposite follower follows the cam track of the auxiliary end, being driven through its single point of engagement to the drive. The track may lie in either a horizontal plane or a vertical plane, and the carrier is at all times supported on the track.

The invention can best be further described and explained by reference to the drawings in which:

FIG. 2 is a plan view of the conveyor and its supporting table;

FIg. 3 is an enlarged view of the left hand portion of the structure shown in FIG. 2, showing the workpiece carriers in positions advanced from those in FIG. 2;

FIG. 4 is an enlarged, fragmentary longitudinal section of the conveyor and table, particularly showing a preferred form of drive means;

FIG. 5 is an enlarged fragmentary plan view of the preferred mechanism by which the carrier is guided along the track and by which it engages the drive; and FIG. 6 is a vertical cross section of the mechanism shown in FIG. 5.

The transfer conveyor of this invention is useful in a wide variety of applications, for moving a workpiece around a loop path without turning it around in the process. For the purpose of illustration and explanation, the invention is described herein primarily in reference to moving a workpiece such as automobile bumper trim in a straight line path beneath a dry printing head, but it should be understood that the invention is not limited to such use.

Figure 1:
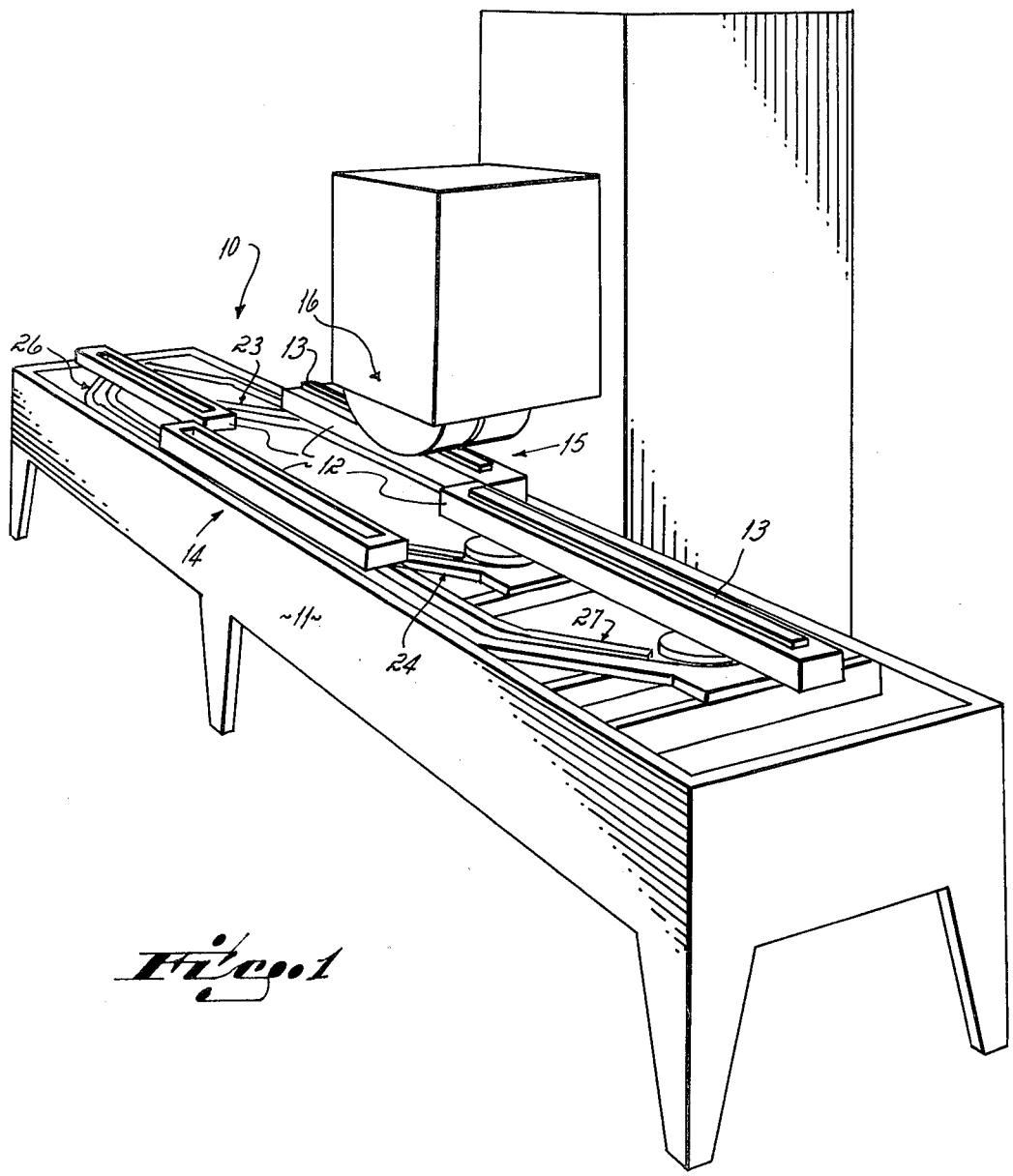
FIG. 1 is a perspective view showing a preferred embodiment of a transfer conveyor in accordance with the invention, in association with a dry printing machine of the roll-on type.

In FIG. 1 a transfer conveyor is indicated generally by 10 and is supported on a frame or table 11. Conveyor 10 moves a series of workpiece carriers (four in the embodiment shown), one of which is desgnated at 12, around a closed loop path of travel. The carriers receive and support elongated workpieces, for example the automobile bumper trim strip designated at 13 in FIG. 1, from a loading station or area 14 around to a work station 15, and then back to the station 14 for unloading. A counterclockwise direction of movement is assumed, as indicated by the arrows in FIGS. 2–4. The conveyor moves the workpiece carrier and the workpiece on the carrier in a longitudinal direction through processing apparatus 16 at work station 15. In the environment illustrated, the apparatus 16 comprises a dry printing head. This may be conventional and does not itself comprise the invention. Such dry printing apparatus may for example be of the type shown in Boettcher U.S. Pat. No. 3,975,226.

Each workpiece carrier moves in a horizontal plane, and travels through work station 15 on a straight line path. This straight line path of movement relative to the work apparatus is important (in the environment illustrated) because movement about a fixed center or on a curved path will cause smearing or improper print transfer onto the workpiece.

Figure 3A:
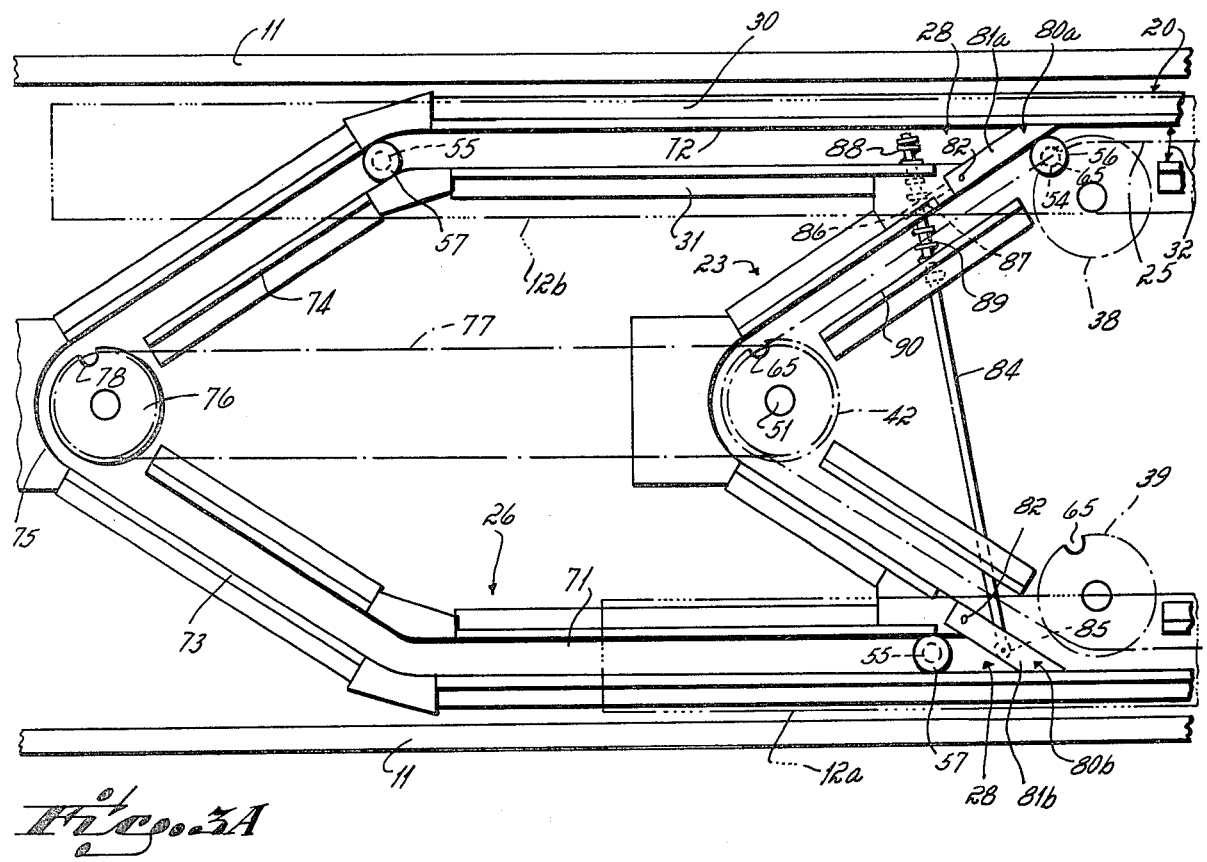
FIGS. 3A and 3B are views similar to FIG. 3 but show the workpiece carriers in progressively further advanced positions.
Figure 3B:
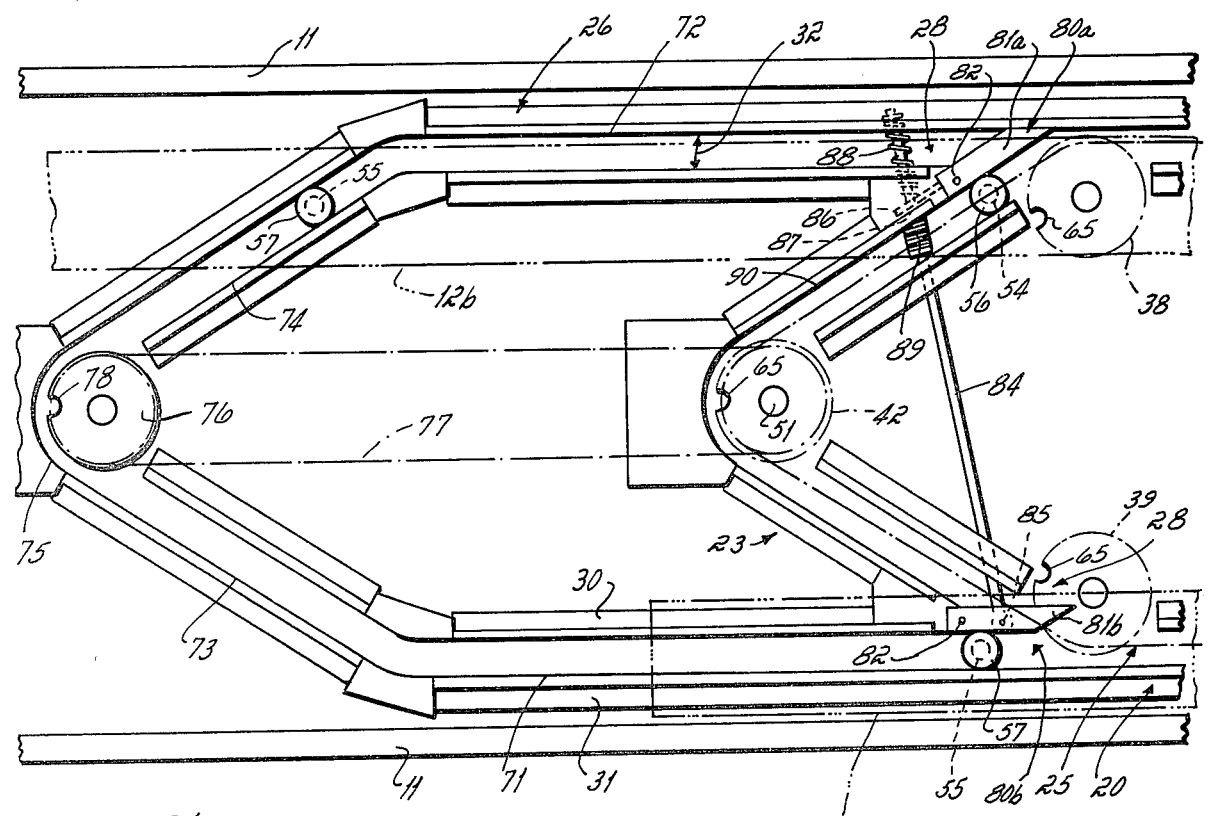

The layout of conveyor 10 is most clearly seen in FIG. 2. (The underlying support structure of table 11 has been omitted in this figure for simplification, but is shown in FIGS. 3 and 4.) More particularly, the conveyor includes a main track 20, which defines a loop path 20 with two main runs 21 and 22 (shown as straight runs) that are connected by main loop ends 23 and 24. The load/unload area 14 is on main or straight run 22, while the opposite main or straight run 21 passes through work station 15. In the embodiment shown each end 23 and 24 of the main loop 20 is generally "V" shaped in plan, with two legs that are angulated at about 30° to the straight runs 21 and 22. A conveyor or endless loop drive, indicated by the dashed line 25 in FIGS. 2–3B, extends around loop 20 to move the carriers, as described below in greater detail.

Outwardly of each end 23 and 24 of main loop 20 there is provided track which forms auxiliary ends 26 and 27 respectively. As shown in FIG. 2, each auxiliary end 26 and 27 has a configuration or contour that preferably is similar to the contour of the adjacent end 23 or 24 of main loop 20, the auxiliary ends being offset (as measured in the direction parallel to straight runs 21 or 22) from the corresponding points of the main loop by a distance d, as indicated in FIG. 3. (In the embodiment shown the auxiliary ends lie on the outside of the main loop 20, although this is not critical and one or both auxiliary ends may reside inside the main loop.) The auxiliary ends and the main loop ends meet the main runs to form junctions as at 28.

The track which forms the main loop and the auxiliary ends comprises spaced apart rails, as designated at 30 and 31, which are separated by a uniform cam slot or rollerway 32 between them. The drive 25 for propelling the workpiece carriers 12 around the track comprises, in the preferred embodiment, an endless chain formed of a series of links, as designated at 35 (see FIGS. 5 and 6). The links engage and are supported by a series of sprockets, six in the embodiment shown, for travel down the center of rollerway 32. The sprockets include four sprockets 38, 39, 40 and 41, located where straight runs 21 and 22 meet ends 23 and 24 of the main loop. The sprockets of the main loop also include two end sprockets 42 and 43.

At least one of these sprockets 38–43 is driven by a prime mover. Suitably, as shown in FIG. 4, an electric motor 48, acting through a speed reducer 49 and a drive chain 50, turns a shaft 51 to which end sprocket 42 is keyed.

Each workpiece carrier 12 presents a pair of drive connections that are releasably engageable with the conveyor, preferably in the form of downwardly extending pins 54 and 55 which are spaced apart by the predetermined distance designated d, see FIG. 2, which equals the offsets of the auxiliary ends from the main loop. As shown in FIGS. 5 and 6, track followers in the form of horizontal rollers 56 and 57 are journaled for rotation about the axes of the respective pins 54 and 55. These rollers are dimensioned so that they are closely received between opposed inwardly facing guides 58, 59 mounted on the inside faces of rails 30 and 31. As shown in FIG. 6, as drive 25 moves workpiece 12 along the track, the roller controls the path of travel, being confined to the rollerway or cam path 32 that is defined between the guides 58 and 59. The carrier 12 conveniently slides or rolls on wear pads on the upper face of tracks 30 and 31. Thus the carrier is supported by the wear pads on both sides of the cam slot, and it is driven by the chain drive. Each carrier includes an appropriate jig, not shown, for receiving the particular type of workpiece to be processed.

It is an important aspect of the invention that whereas both rollers 56 and 57 remain in contact with the guides 58 and 59 essentially throughout the entire cycle of movement around the loop, both of the pins 54 and 55 do not always engage the drive; the drive engages or disengages one or the other of them at different points around loop 20. Specifically, where a workpiece carrier is moving along either straight run 21 or 22 in the main loop, both pins 54 and 55 are engaged by drive 25; depending upon the direction of drive movement (which is assumed to be counterclockwise in the embodiment shown) one of the pins will comprise the leading pin on a given run and the other pin will comprise the trailing pin. However, at either main loop end 23 or 24, drive 25 engages only one of the two pins on the carrier; the other pin is disengaged during that portion of loop traverse, as will be described.

To establish such engagement and release of the pins by the drive, the drive is provided with pin receiving means designated at 63 in FIGS. 5 and 6, which presents a notch 64 in the center line of the drive, so that the axis of the pin 54 or 55 will approximately intersect the centerline of the drive. This is desirable to prevent a skewing or transverse force acting on the pin as the drive moves. The engagement or release of a pin in the notch 64 occurs by a camming movement in which the carrier pin moves diagonally relative to the midline of the drive, through the outer end of notch 64 into the pin receiving means 63.

Because the links 35 of drive 25 engage the teeth of each sprocket 38–43, each sprocket presents a recess or notch as designated at 65 which is sized to accommodate the pin 54 or 55 when the pin passes the sprocket.

When the conveyor is moving one drive pin 54 or 55 of a particular carrier along an end 23 or 24 of the main loop, the other pin 55 or 54 of that carrier is out of engagement with the drive, and the corresponding track follower 57 or 56 is tracking on the associated auxiliary end 26 or 27, see for example the positions of the pins 54 and 55 of the workpiece carrier designated as 12a in FIG. 2.

The left and right auxiliary ends 26 and 27 may be mirror images of one another. Referring to the left auxiliary end 26 in more detail, as shown in FIG. 2, it includes portions 71 and 72 which are extensions of main loop straight runs 22 and 21 respectively. The portions 71 and 72 lead to angulated legs 73 and 74 which are parallel to the legs of main loop end 23. A curved center section 75 joins legs 73 and 74. Each of these sections 71–75 is defined by parallel rails similar in section to the rails 30 and 31, and the outer rails of the portions 71 and 72 may join the outer rails 31 of straight runs 21 and 22.

A driven disc 76 is positioned in the curved center section 75, to pick up (engage) the pin of a workpiece carrier as it moves from leg 74 to leg 73, to carry it positively around the "corner" or angle between them. The disc 76 is driven in synchronism with the main loop end sprocket 42 through an auxiliary chain and sprocket drive 77, see particularly FIGS. 3 and 4. A notch or dog 78 is formed in disc 76, sized to receive the pin 54 or 55 of the carrier.

In the embodiment shown, the right auxiliary end 27 is similar to the left end 26 just described, and hence need not be further described herein.

As conveyor 25 wears with use, it will effectively become longer. The slack can be taken up, but this should be done without so changing the spacing between the pin-engaging means 63 that they cannot properly engage the pins. A preferred means of adjustment is to shift one end of the conveyor, including both the end sprocket 42 and the disc 76, relatively away (to the left in FIG. 1) from the remainder of the conveyor. For this purpose the end tracks may be separated, as designated at 91 in FIG. 3, and mounted on understructure including transverse beams 92, which can be shifted as a unit to take up slack in the conveyor.

To take up wear in the auxiliary chain, a symmetrical pair of idlers 94 (shown in FIG. 3) may be provided. The idler sprockets are mounted on the ends of a bar 95 which is mounted from a cross brace 92 for pivoting about a point midway between the opposite runs of chain 77, and also midway between the centers of sprocket 42 and wheel 76. As bar 95 is pivoted, the sprockets at its ends equally take up slack, and thereby prevent loss of the synchronism between sprocket 42 and disc 76.

Switch means are provided to direct a track follower either onto the downstream main loop end, or alternatively onto the adjacent auxiliary end. As indicated in FIG. 2, switches designated at 80a, b, c and d are positioned adjacent each sprocket 38, 39, 40 and 41, at the junctions 28 of the main loop ends and the auxiliary ends with the straight runs. In the preferred embodiment, each switch 80 includes an arm 81, two of which are shown at 81a and b in FIG. 3. The arm of each switch is swingable about a pivot 82 between two positions, a "straight" position in which it is generally parallel to the straight run (arm 81a in FIG. 3 is shown in this position), and an "angled" position in line with the adjacent leg of end 23 or 24 (arm 81b in FIG. 3A is shown in the angled position). In the straight position the switch opens the auxiliary end to the follower of a carrier, and the associated drive pin will release from the drive; in the angled position the switch directs or cams the follower onto the end of the main loop, and its associated drive pin continues to remain in engagement with the drive.

More particularly, as a carrier approaches a switch from a straight run of the main loop, the switch is actuated by means to be described to the straight position. As the chain passes around the sprocket onto the end of the main loop, the carrier continues to be propelled along a straight line path: its leading track follower moves onto that portion (e.g., at 71 or 72) of the auxiliary end which is in line with the straight run 21 or 22. The drive swings out of engagement with the leading drive pin as the drive passes around the sprocket and below the switch arm. The carrier is then propelled only through the trailing drive pin, which remains engaged with the drive 25. Then, before the trailing pin and follower of that carrier arrives at the switch, the switch arm is moved to the angled position so that the trailing track follower of that carrier will roll over the inside face of the switch arm and the associated drive pin will remain engaged with the drive and will move onto the end of the main loop. The switch is thus operated between the passage of two track followers of a given carrier.

A preferred form of switch operator is shown in FIG. 3, for actuating the switches in response to the position of a carrier. The arms 81a and 81b of the switches at the legs of end portion 23 are cross-connected by a bar 84 which is pivotally and yieldably coupled to them. Specifically, bar 84 is connected to switch arm 81b at 85 and to an extension 86 of switch arm 81a, at a flange 87. Bar 84 engages one of the arms (arm 81a in the embodiment shown) through opposed centering springs 88 and 89 on the opposite sides of a coupling plate 87. This permits yieldability in the cross-connection of the arms. It will be noted that the positions 85 and 87 at which bar 84 is connected to the switch arms are on opposite sides of the respective switch arm pivots 82. When either arm is moved from straight position to angled position, the bar 84 moves in a way that draws the other switch toward the same position. Thus the switches tend to open and close together, unless one of them is restrained.

The function of the switch cross-linkage described is to apply the camming movement of a preceding workpiece carrier past a switch at the downstream leg of a particular end section, for the succeeding carrier.

Operation

When a carrier is on main run of the main loop illustrated, both drive pins 54 and 55 are engaged with drive 25, in two engaging means 63 thereof. When one end of the carrier is traversing a main loop end, only one drive pin is engaged with the drive; the other end is released from the drive and moves on the auxiliary end. At the junction, the one drive pin of the carrier is disengaged from the drive, and is reengaged at a downstream junction.

How this occurs may be understood by following the sequential movement of a carrier which is assumed to be moving counterclockwise around the left end of the conveyor. In FIG. 2 as carrier 12b approaches the downstream junction at switch 80a from straight run 21, switch arm 81a of that switch is in the straight position. A preceding (downstream) carrier 12a is moving around the left end, with its leading follower 56 being driven along main loop end 23 and its trailing track follower 57 being cammed along the angled auxiliary end run 73. The arm 81b of switch 80b at the downstream junction of the left end is also in straight position.

FIG. 3 shows the relative position of the two carriers 12a and 12b when each has progressed a short distance further. At this time the leading track follower 57 of upstream carrier 12b (i.e., the carrier in the direction opposite to the direction of conveyor movement) is passing and tracking on switch arm 81a. At the same time, what is now the leading track follower 56 (having passed around end sprocket 42 and disc 76) of the other carrier 12a, is being carried by the drive past arm 81b of switch 80b at the downstream junction of the left end. This switch arm 81b, which had earlier been in the straight position shown in FIG. 2, is cammed outwardly toward the angle position shown in FIG. 3 by follower 56 as the follower moves past it, and this movement is reflected by shifting of bar 84. Depending on the points at which the switches are located, follower 57 of carrier 12b may momentarily block movement of the opposite switch arm 81a, as shown. If that occurs, centering spring 88 is compressed and permits the bar to accommodate this blocking. After the leading follower 57 of carrier 12b has passed switch arm 81a and is traveling on the auxiliary end run 72, compression of spring 88 is released and switch arm 81a is snapped to its angled position. Thus, after the leading roller of carrier 12b has passed but before the trailing roller 56 thereof has reached switch 80a, both that switch and the opposite switch 80b are moved to angle positions as shown in FIG. 3A.

From this point carrier 12b is propelled by the conveyor through the "single point" engagement with pin 54, adjacent trailing follower 57. The leading roller 57 merely tracks in the cam slot of the auxiliary end.

As noted previously, the offset d of the auxiliary loop matches the spacing between the centers of the rollers 56 and 57, so that when lead roller 57 reaches the angulated leg 74 of the auxiliary end, the trailing roller 56 thereof simultaneously arrives at the corresponding angulated portion 90 of main loop end 23. Since switch arm 81a is now in the angle position, both the leading 57 and trailing rollers 56 track on the angulated portions of the respective end paths, as shown in FIG. 3A. As this occurs the trailing roller 57 of preceding carrier 12a approaches switch arm 81b; that carrier is now being pulled by the drive which is engaging its lead drive pin. As roller 57 is pulled past that switch arm 81b, as indicated in FIG. 3B, the roller cams that switch arm from the angle to the straight position shown. Roller 56 of upstream carrier 12b however blocks movement of switch arm 81a to its straight position, until roller 56 has passed the switch arm pivot 82. Until that occurs spring 89 is compressed on bar 84, as shown in FIG. 3B. When the roller 56 passes switch pivot 82 the blocking effect on switch arm 81a is no longer present, and the compressed spring snaps the switch to the straight position so that both switches are then restored back to the earlier condition shown in FIG. 2, awaiting the passage of the first roller of the next following carrier. The pin 55 associated with trailing follower 57 of carrier 12a is picked up by an engager 63 of the drive, and that carrier is thereafter propelled on the straight run by a two point drive connection.

At the other end of the main loop in the embodiment shown, the pin 54 (which was earlier engaged with drive 25 around the left end 23) is released, and its roller 56 will track around the right auxiliary end 27. Thus the drive connections between the drive and the carrier are reversed at the opposite ends of the loop, in this embodiment.

When the track followers or rollers of a particular carrier are moving on the track ends, the sole driving force on the carrier comes from the engagement of a single drive pin with the conveyor. The drive exerts a force on the pin in the direction of chain travel, which in these circumstances is transverse or skew to the axis of the carrier. This would tend to move the carrier out of the desired orientation; however, since one follower of that carrier is constrained within the cam track of the auxiliary end, the carrier can only move with its axis always parallel to the straight runs, even though such motion is skewed to the direction of the force exerted on it by the drive.

When a track follower reaches the middle sprocket 42 of the main loop end, it is swung around by that sprocket and begins to move on the other leg of the main loop end. As this occurs, the force applied by the drive to that follower momentarily is directed perpendicular to the axis of the carrier. Since this force has no vectorial component parallel to the cam track of the auxiliary end, it does not impart lineal movement to the other end of the carrier. Absent some additional driving means, this could tend to cause binding at the other end of the carrier. The auxiliary end disc 76 avoids this, because its notch 78 engages the drive pin, swings that pin over dead center and transfers it into the other leg of the auxiliary end, where cammed linear motion can resume. Thus in this manner the carrier is enabled to move over the "corner" between the legs without binding, even though it is otherwise driven from one end only over the end paths.

The provision of end tracks which are formed of angulated straight sections as at 73 and 74 rather than gradually curved sections, is advantageous and is preferred. First, the straight legs 73 and 74 can be formed from bar stock and do not require shaping to long curved paths as would be necessary for installations of substantial width. Also, the angulation of the angled legs 73 and 74 with respect to the straight runs 21 and 22 reduces the clearance spacing required between adjacent carriers. In effect, the leading end of a carrier moving on an end of the main loop, can more closely be brought into place behind the trailing end of a preceding carrier moving on the straight run, because it moves in a sideways component of motion. This provides an advantage of relative compactness of the overall dimensions of the conveyor, and is preferred for that reason.

The conveyor can be driven intermittently or continuously as desired. Carriers can readily be lifted off the conveyor since the only connection is by interfit of the pins 54 and 55 into the pin receiving means 63 on the conveyor. The receiving means 63 are spaced uniformly along the length of the conveyor to receive the pins, and the total length of the chain should be a multiple of the distance d.

In the embodiment illustrated, the main loop 20 has two opposite parallel straight runs 21 and 22, and four switches 80. This is a "universal" layout which can be used for either direction of rotation, as desired. That is, the switch operators will properly actuate the switches regardless of whether the carriers move clockwise, or counterclockwise. In its more general aspect, the invention contemplates a single main run with a switch at the downstream end thereof for connecting the two followers of a carrier moving thereon alternatively to the auxiliary end and to the main loop end. A switch at the upstream end of a main run is not needed to control the passage of the followers past it, but it is preferred for the carrier position-responsive means for actuating another switch.

In the embodiment illustrated, the main runs 21 and 22 are in the form of straight runs. This will be desirable where the workpiece is to move through the work station on a straight line path. However, the main runs need not necessarily be either straight or parallel to one another. For example, the conveyor may be oriented vertically and a main run may be curved to carry a contoured workpiece (such as a convexly curved workpiece) past a printing head. It should also be understood that where the carrier is moving along a main run (straight or curved), it is unnecessary to have both drive pins engaged with the drive; the carrier may be pulled by its leading drive pin only, or pushed from its trailing drive pin only. The track follower of the other or free pin may move in a cammed motion on the same track or on a separate track of different configuration, as may be appropriate for a particular desired type of workpiece movement.

To maintain the workpiece in an orientation that is at all times parallel to the direction of straight runs 21 and 22, the auxiliary ends 26 and 27 should be configured similarly to the main loop ends 23 and 24, as already described. However, where such constant orientation is not required or is not desired, the auxiliary ends may be configured differently than the respective main loop ends. Since the carrier is cammed across the auxiliary end, rather than positively moved across it by a direct drive, any differences in the configurations of adjacent end tracks is accommodated.

Having described the invention, what is claimed is:

1. A conveyor for moving an elongated workpiece around a loop path without turning it, comprising,
    a track in the form of a main loop which includes main runs and main loop ends joining the main runs,
    the track also including auxiliary ends which are offset from the main loop ends, the auxiliary ends and the main loop ends meeting the main runs at junctions,
    a carrier for the workpiece, the carrier having first and second followers engaging the track to follow the same,
    an endless loop drive extending around the main loop for propelling the carrier,
    said drive engaging said carrier through two drive connections adjacent the respective followers, each of which is releasable from the drive,
    the carrier being driven by whichever of said connections engages the drive,
    a switch at the downstream junction of each main run for connecting the main run to the respective end of the main loop or alternatively to the respective auxiliary end, and
    a switch operator for each switch, the operator being responsive to the position of a carrier to operate the switch after a first follower on a carrier coming from the respective main run has passed the switch but before the second follower of the carrier has passed that switch, to direct one follower of the carrier to move on an end of the main loop and the other follower to move on the auxiliary end.

2. The conveyor of claim 1 wherein the switch operator is responsive to the position of a preceding carrier also moved by said drive.

3. The conveyor of claim 1 wherein two switches serve each auxiliary end, and wherein the switch operator comprises means cross-connecting these two switches,
    operation of one switch being transmitted through the cross-connecting means to operate the other of said switches.

4. The conveyor of claim 3 wherein said two switches are connected by said cross-connecting means which tends to close both switches together and to open both switches together.

5. The conveyor of claim 4 wherein said cross-connecting means is connected to one of the switches through opposed centering springs, to provide a yieldable connection to the switch.

6. The conveyor of claim 1 wherein the switch operator is responsive to the camming of a downstream switch by a follower of a first carrier, to operate an upstream switch for a second carrier.

7. The conveyor of claim 1 wherein said ends and auxiliary ends are all "V" shaped, with angulated legs.

8. The conveyor of claim 7 further including a driven sprocket between said angulated legs of the auxiliary end,
    the sprocket being engageable with the carrier to shift the follower from one leg to the other.

9. The conveyor of claim 1 wherein said track lies in a horizontal plane and
    said carrier is supported by said track.

10. The conveyor of claim 1 wherein said track comprises a pair of spaced apart rails which define a cam slot between them, and
    said followers track on both sides of said slot.

11. The conveyor of claim 10 wherein said carrier is supported on both said rails, on each side of said slot.

12. The conveyor of claim 1 wherein the auxiliary ends are configured similarly to the respective main loop ends.

13. The conveyor of claim 1 wherein the drive connections comprise pins projecting from the carrier, and seats in the chain for receiving the respective pins,
    the pins being positioned axially in line with the respective followers.

14. The conveyor of claim 1, wherein both the main loop ends and the auxiliary ends include linear legs which meet the respective main runs at angles of about 30°.

15. The conveyor of claim 1 wherein at least one main run is a straight run.

* * * * *